(12) United States Patent
Ponnada (10) Patent No.: US 11,933,265 B2
(45) Date of Patent: Mar. 19, 2024

(54) WIND TURBINE BLADE ASSEMBLY AND METHOD FOR MANUFACTURING

(71) Applicant: Siemens Gamesa Renewable Energy A/S, Brande (DK)

(72) Inventor: Sri Markandeya Rajesh Ponnada, Montreal (CA)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/910,730

(22) PCT Filed: Jan. 1, 2021

(86) PCT No.: PCT/EP2021/051275
§ 371 (c)(1),
(2) Date: Sep. 9, 2022

(87) PCT Pub. No.: WO2021/180389
PCT Pub. Date: Sep. 16, 2021

(65) Prior Publication Data
US 2023/0142232 A1    May 11, 2023

(30) Foreign Application Priority Data
Mar. 13, 2020    (EP) ..................................... 20163198

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2240/307* (2020.08); *F05D 2260/31* (2013.01)

(58) Field of Classification Search
CPC .............................. F03D 1/0675; F03D 80/30
See application file for complete search history.

(56) References Cited

U.S. PATENT DOCUMENTS

| | | | |
|---|---|---|---|
| 8,734,110 B2 * | 5/2014 | Kuroiwa | ................. F03D 80/30 |
| | | | 416/224 |
| 9,644,613 B2 * | 5/2017 | Erichsen | ............... F03D 1/0675 |
| | | (Continued) | |

FOREIGN PATENT DOCUMENTS

| | | |
|---|---|---|
| CN | 107956656 A | 4/2018 |
| CN | 108223306 A | 6/2018 |
| | (Continued) | |

OTHER PUBLICATIONS

International Standard: "IEC 61400-24; Edition 1.0; Jun. 2010"; Wind Turbines—PART 24: Lightning Protection; pp. 1-158, Year: Jun. 16, 2010; ISBN 978-2-88910-969-2.
(Continued)

*Primary Examiner* — Eldon T Brockman
(74) *Attorney, Agent, or Firm* — Schmeiser, Olsen & Watts LLP (57) ABSTRACT

A wind turbine blade assembly, includes a wind turbine blade and a lightning protection system including an internal down conductor inside the wind turbine blade and multiple air termination devices having a receptor, which is electrically conductively coupled to the down conductor, wherein the length of the wind turbine blade assembly is divided into a first part having the internal down conductor and spanning from the blade root to at least one first air termination device and a second part spanning from the first air termination device to the assembly tip, wherein the lightning protection system further includes a second air termination device in the second part, and an external, electrically conductive strip extending between a pair of a first and a second air termination devices in the second part and being electrically conductively coupled to their receptors.

15 Claims, 9 Drawing Sheets

(56) References Cited

U.S. PATENT DOCUMENTS

| | | | |
|---|---|---|---|
| 10,202,966 B2* | 2/2019 | Lipka | F03D 80/30 |
| 10,260,482 B2* | 4/2019 | Ohlerich | F03D 1/0675 |
| 10,443,579 B2* | 10/2019 | Tobin | F03D 80/30 |
| 10,465,662 B2* | 11/2019 | Søgaard | F03D 80/30 |
| 10,815,973 B2* | 10/2020 | Flach | F03D 80/30 |
| 11,486,366 B2* | 11/2022 | Christiansen | F03D 80/30 |
| 2011/0142671 A1* | 6/2011 | Fritz | F03D 80/30 |
| | | | 324/511 |
| 2011/0182731 A1 | 7/2011 | Naka et al. | |
| 2013/0280073 A1* | 10/2013 | Erichsen | F03D 80/30 |
| | | | 416/146 R |
| 2016/0177915 A1 | 6/2016 | Gonzalez et al. | |
| 2017/0045036 A1* | 2/2017 | Ohlerich | F03D 1/0675 |
| 2018/0135602 A1* | 5/2018 | Tobin | F03D 1/0675 |
| 2019/0040846 A1* | 2/2019 | Flach | F03D 80/30 |
| 2020/0056595 A1 | 2/2020 | Christiansen | |
| 2020/0056596 A1* | 2/2020 | Christiansen | B29C 70/72 |
| 2020/0095983 A1 | 3/2020 | Girschig et al. | |

FOREIGN PATENT DOCUMENTS

| | | |
|---|---|---|
| CN | 108266335 B | 11/2019 |
| DE | 102015200370 A1 | 7/2015 |
| EP | 1272759 A1 | 1/2003 |
| EP | 2623773 A2 | 8/2013 |
| EP | 2798206 A2 | 11/2014 |
| EP | 2944809 A1 | 11/2015 |
| EP | 3628863 A1 | 4/2020 |
| WO | WO0177527 A1 | 10/2001 |
| WO | WO 2013097855 A2 | 7/2013 |

OTHER PUBLICATIONS

Ayub et al.; "External lightning protection system for wind turbine blades: Further considerations"; APICL; 2015.
Jomitek; FluoroGrip LS-1000 Lightning tape; http://jomitek.dk/; 2021.
International Search Report and Written Opinion dated May 7, 2021 for application No. PCT/EP2021/051275.
"Design Guide for Glass Fiber Reinforced Plastic (GFRP) Wind Turbine Blades" by Shine Wire Products Inc., available from https://wxguardwind.com/.

* cited by examiner

WIND TURBINE BLADE ASSEMBLY AND METHOD FOR MANUFACTURING

CROSS-REFERENCE TO RELATED APPLICATIONS

This application claims priority to PCT Application No. PCT/EP2021/051275, having a filing date of Jan. 21, 2021, which claims priority to EP Application No.20163198.3, having a filing date of Mar. 13, 2020, the entire contents both of which are hereby incorporated by reference.

FIELD OF TECHNOLOGY

The following relates to a wind turbine blade assembly, comprising
- a wind turbine blade having a blade root for connection to the hub of a wind turbine,
- an assembly tip, which is either formed by a blade tip of the wind turbine blade or an add-on tip of a wind turbine blade add-on attached to the blade tip of the wind turbine blade, wherein the wind turbine blade assembly spans a length from the blade root to the assembly tip, and
- a lightning protection system comprising an internal down conductor inside the wind turbine blade and multiple air termination devices having at least one receptor, which is electrically conductively coupled to the down conductor.

The following further relates to a method for manufacturing such a wind turbine blade assembly having a wind turbine blade add-on.

BACKGROUND

Modern wind turbines usually comprise a tower, on top of which the nacelle and a hub are mounted. To the hub, wind turbine blades are mounted at their blade roots. Since wind turbines tend to get higher and/or wind turbine blades tend to get longer, the probability for a lightning strike in the area of the wind turbine blade tip increases. The probability of a lightning strike impact is highest at the blade tip end and usually decreases towards the blade root.

It has also been proposed in the art to retrofit wind turbine blades with so-called tip add-ons (wind turbine blade add-ons), for example extensions and/or winglets. In the context of embodiments of the current invention, the wind turbine blade assembly may either be a wind turbine blade without a wind turbine blade add-on or a wind turbine blade having a wind turbine blade add-on (tip add-on) installed. In a retrofitted wind turbine blade, the end of the wind turbine blade add-on may become the new tip end of the wind turbine blade assembly, such that, in following, the term "assembly tip" refers either to the blade tip of the wind turbine blade without tip add-on or to the add-on tip for the wind turbine blade with tip add-on. Using a wind turbine blade add-on increases the effective blade length. Consequently, in this case, the wind turbine blade add-ons are the components having the highest risk to be impacted by a lightning strike. Wind turbine blade add-ons, as well as blade tips of wind turbine blades, may be manufactured from non-conducting materials, which are highly vulnerable to lightning effects.

To protect components of the wind turbine blade assembly from lightning strikes, lightning protection systems (LPS) are used. Such lightning protection systems usually comprise lightning receptors, which are also called air termination points and often part of air termination devices additionally comprising an air termination base. LPS further comprise lightning down conductors and grounding in the soil of the wind turbine. While the lightning receptors are usually placed on the surface of the wind turbine blade assembly, for down conductors, these may be installed on the internal or the external side of the wind turbine blade. Often, it has been opted to install the down conductors on the internal side of a wind turbine blade to preserve the aerodynamic properties of the blade's surfaces. However, concepts and products for external down conductors for wind turbine blades have also been proposed.

For example, in an article by A. S. Ayub et al., "External Lightning Protection System for Wind Turbines Blades—Further Considerations", 2015 Asia-Pacific International Conference on Lightning (APL), Nagoya, Japan, the question is addressed whether a single external down conductor could be deployed in an optimal position for least effect on aerodynamic performance. The results show that the degradation on aerodynamic property is least at the trailing edge or the leading edge of the blade, indicating that the installation of external down conductors may be viable in that region.

Furthermore, a product named "FluoroGrip LS-1000 Lightning tape" by Jomitek, has been proposed to support retrofit protection of installed blades. In this manner, the potential of the inner parts and the surface shall be 2haracter.

However, these solutions come with disadvantages. Having internal down conductors adds to the risk of a lightning penetration into the laminate as it attaches to streamers emanating from them leading to structural damage and possible explosive expansion of water. Insulation, when used, adds to the weight of the wind turbine blade. If metallic meshes are used as external down conductors, the lifetime is limited and frequent maintenance is required. Such meshes are typically based on copper and aluminum such that they can also witness corrosion. Galvanic corrosion when coupled with carbon-based materials is another concern.

External lightning protection systems can also have aerodynamic and noise constraints. To 3haracte these, external down conductors are manufactured with very low thickness. External down conductors such as tapes can have limited lifetime. For example, the lightning protection tape by Jomitek cited above can typically take only one lightning strike at 200 Ka. Tapes hence behave as wear parts and need expensive field maintenance. However, a key constraint are mechanical strains, in particular flap-wise and edge-wise bending. This particularly applies when the tape is employed along a full length of the wind turbine blade as it has to pass through high-strain locations. Furthermore, adhesive-based mounting of external down conductors is challenged by peel forces originating from winds.

Regarding wind turbine blade add-ons, in particular extensions and/or winglets, approaches for lightning protection have also been proposed in the state of the art. For example, in not yet published European Patent Application EP 18 196 894.2, an internal down conductor is connectable or connected to a respective internal conductor of the rotor blade, in particular via a respective interface. Such a lightning protection system could also be electrically insulated. Further, in the "Design Guide for Glass Fiber Reinforced Plastic (GFRP) Wind Turbine Blades" by Shine Wire Products Inc., available from https://wxguardwind.com/, the use of continuous or segmented metallic diverter strips that extend the interception reach of the tip receptor on an existing wind turbine blade has been proposed.

The first mentioned approach requires the design of an interface between the lightning protection system in the wind turbine blade add-on and the existing wind turbine blade. This interface is both difficult to realise and usually the weak link in the system, in particular as it also coincides with the location of the structural interface. Manufacturing and integration can be bothersome. Another concern is that such lightning protection systems are usually very "tip-heavy". Additionally, having an internal down conductor again adds to the risk of lightning penetration into the structure of the wind turbine blade and/or the add-on. On the other hand, diverter strips may be considered as a wear part that would require periodic replacement. Moreover, segmented diverter strips are limited in their interception reach. A further, common disadvantage is that the interface between the respective lightning protection systems in the wind turbine blade add-on and the existing wind turbine blade needs to be installed in the field, that is, on mounted blades under variable environmental conditions, which is very sophisticated and expensive.

WO 2013/097855 A2 discloses a wind turbine blade and a method for manufacturing a wind turbine blade. The lightning protection system of this wind turbine blade comprises an internal lightning conductor located along a longitudinal portion of the wind turbine blade, wherein a lightning receptor module is arranged on an external surface of the wind turbine blade and electrically coupled to the lightning conductor. An elongate receptor band is installed on the external surface of the wind turbine blade, over the lightning receptor module, and the receptor band is arranged to receive a stroke of lightning and transfer electrical current from the lightning stroke to the lightning conductor through the lightning receptor module. The elongate receptor band comprises a crease in the longitudinal cross-sectional profile of the elongate receptor band.

WO 01/77527 A1 discloses a lightning protection system for a wind turbine and a wind turbine blade having such a lightning protection system. The system comprises one or more internal conducting means and also has one or more external lightning conducting means mounted on the surface or an immediate proximity of the surface of said turbine and connection means by means of which said internal and external lightning conducting means are connected.

Both of these solutions use conductive bands on an exterior surface of a wind turbine blade. However, the approach relies on bands placed above, that is parallel to, an existing interior down conductor, providing the possibility of lightning strikes entering the laminate, which may lead to structural damage.

SUMMARY

An aspect relates to provide a lightning protection system with a reduced risk of structural damage to blade components and which is, in particular in the case of a wind turbine blade add-on, easy and cost-effective to install.

According to embodiments of the invention, in a wind turbine blade assembly as initially described, the length of the wind turbine blade assembly is divided into a first part spanning from the blade root to at least one first air termination device, wherein the internal down conductor extends in the first part, and a second part spanning from the first air termination device to the assembly tip, wherein the lightning protection system further comprises at least one second air termination device in the second part, and at least one external, electrically conductive strip extending at least between a pair of a first and a second air termination device in the second part and being electrically conductively coupled to their receptors.

Electrically conductively coupled means that a direct conductive connection is present or at least a spark gap providing conductivity in the case of lightning, that is, once a certain electrical potential threshold is exceeded. External means extending on an outer surface of the wind turbine blade assembly.

Embodiments of the invention thus proposes to divide the length of the wind turbine blade assembly in two parts, wherein, in one part, an internal lightning down conductor extends inside the wind turbine blade, and, in the second part, an external down conductor is a conductive strip, which electrically conductively couples lightning receptors of two air termination devices. That is, the at least one second air termination device, respectively its lightning receptor, is not directly connected to the internal down conductor, but indirectly using the electrically conductive strip and the receptor of the at least one first air termination device. The main idea of embodiments of the present invention is that the assembly tip is the most exposed region of the wind turbine blade assembly and must be sufficiently protected against lightning damage. Thus, a combined receptor-down conductor apparatus is employed external to the wind turbine blade assembly surface in the outermost region of the wind turbine blade and uses an internal down conductor for the rest of the length of the wind turbine blade assembly. Without an internal down conductor in the second part, lightning finds little or no reason to enter the laminate, such that structural damage may be prevented. This is of special advantage for wind turbine blade add-ons as they can be made of purely structural components.

Further, the electrically conductive strip may be simply added on the surface of the wind turbine blade assembly, spanning a part of the add-on and a part of the wind turbine blade without having to provide a special electrical interface at the structural interface between the two components of the wind turbine blade assembly. The strip may be manufactured from environmentally stable materials and may have a thickness in the order of some to many millimeters, for example 2 to 50 mm.

The proposed lightning protection system and method have the advantage of simple and fast integration, being inexpensive, having ease of inspection and maintenance, but above all provide enhanced protection to the structure of the wind turbine blade tip/wind turbine blade add-on through preventive control. In particular, in a lightning protection system that is positioned on the exterior in the assembly tip region of the blade, with the absence of the internal down conductor in this area (second part of the length), lightning is not expected to penetrate the structure of the blade tip and/or the wind turbine blade add-on. Hence, the so-called puncture damage mode in this second part will be close to obsolete. This, in turn, allows to reduce certain quality requirements, for example the size and distribution of air entrapments during production or the extent of moisture increase in the field leading to so-called "split tips". Hence, manufacturing and repair cost and time is also reduced.

It is noted that, since the strip is only provided in the second part of the length, it is not subject to wind turbine blade strains, as the assembly tip is a low-strain region. Additionally, using a common receptor-conductor system in the assembly tip area, this system can function as a giant receptor having a larger interceptional range and suitable to handle lightning erosion for the entire blade lifetime. In other words, the lightning receptor of the air termination device as a wear part is less stressed, since, due to the at least one strip, a wider area is available for lightning reception.

Using the strips electrically conductively connecting pairs of first and second air termination devices, an externally visible structure is provided which is easy to monitor for manufacturing and life cycled defects. This may be possible even on a moving blade. Stronger integration into the blade structure/blade geometry can also be implemented, if necessary, by placing the air termination basis of the air termination devices in air foil shaped blocks of foam core.

The simplicity of the concept according to embodiments of the invention allows for easy adaptation to any wind turbine blades/wind turbine blade add-on type with minimal lead-time and cost. Moreover, the weight of possible insulation will also be saved. When applied to wind turbine blade assemblies having wind turbine blade add-ons, the strip acts as a bridge between the original wind turbine blade and the tip add-on. Wind turbine blade add-ons may, for example, be an extension and/or a winglet.

Generally, the conductive band can be made of metals, metal-based composites, carbon, and/or similar materials, including their composites that may contain metallic particles of varied shapes and sizes. The electrically conductive strip may further comprise hybrid structures, for example multi-layered structures involving metals, carbon, ETC, and/or their composites. The electrically conductive strip can be solid, hollow, grooved, slotted, internally porous, meshed, braided or take other such formats. The electrically conductive strip may take a mesh-like or slotted form to save weight. It may be provided with dimples or grid-marks to promote adhesion. The edges of the conductive strip also do not necessarily require a straight edge and the thickness profile need not necessarily be flat, as will be further discussed below. The electrically conductive strip may typically be straight, but can also be curved or bent.

The strip may be made of a continuous material or may be segmented. The electrically conductive strip may, for example, take the form of a continuous metallic strip or a segmented diverter strip. Using a segmented strip may be advantageous in some cases where different conductivities shall be enforced. For example, different segment distances may be provided in different strips and/or different sections of a strip, in particular to favour a certain receptor to receive a lightning strike. In this manner, lightning can be guided to certain lightning receptors, in particular increasing the likelihood that a certain receptor is targeted.

In exemplary embodiments, the strip may be electrically conductively coupled to the receptors of the respective first and second air termination devices by spark gap. In this manner, the strip may be installed without having to access or manipulate the air termination devices. The strip may simply end in a predetermined distance from the receptor of the air termination device such that a spark gap is formed which becomes conductive once a certain electrical potential drop is present, leading to 7haracteri of the air between the lightning receptor and the strip at least in case of a lightning strike.

As, however, when spark gaps are used, the ends of the strips may be subject to erosion and/or other wear effects, different advantageous measures may be taken according to embodiments of the invention to ensure a high lifetime of the electrically conductive strips and a high number of cycles. These measures/embodiments may, of course, be combined.

The strip may at least partly surround at least one of the receptors in a predefined distance, in particular ring-like. For example, the electrically conductive strip may terminate into a flat ring around the air termination point, thus providing a larger edge for the spark gap.

Additionally, or alternatively, it may be advantageous to increase the width and/or the thickness of the conductive material of the strip in a coupling area around the respective receptors with respect to a non-coupling area farther away from the receptors. In this manner, more conductive material can be added at the ends of the electrically conductive strip where a greater erosion may be expected. Such addition of material is desirable in the thickness direction, while an areal increase in size is also possible. For example, in a direction towards the receptor, the electrically conductive strip may have a continuously increasing thickness profile. Generally, the ends of the strip can take a variety of shapes, such as rectangular or rounded. It is noted that, similarly, the electrically conductive strip segments of the ends of segmented strips may also be thickened and/or enlarged. In these embodiments, melting and/or erosion due to the spark gap may be compensated for.

In an alternative, less desirable embodiment, the electrically conductive strip may be mechanically fastened to the air termination devices by the receptor, in particular being clamped between the receptor and an air termination base of the air termination device. In this manner, the electrically conductive strip is in physical, electrically conductive contact with the lightning receptor, that is, an air termination point. The electrically conductive strip may be pressed between the receptor and the air termination base of the air termination device. In embodiments, the connection between the strip and the air termination device may ideally be achieved with standard bolted air termination, in particular a threaded receptor, however, the design may be modified to retain the screw function while relegating the air termination function to no or lower profile. For example, a shear-off bolt having no receptor head, a bolt having a counter-sunk receptor head or a bolt having a rounded receptor head may be used as the bolt. These geometries may be used to relocate a part of the receiving function to the strip. However, other methods, such as riveting, welding and the like, may also be used to fasten the strip to the air termination device. It is noted that mechanically fastening the strip by the in particular threaded receptors is also advantageous since this may be the main method for fastening, such that affixing by adhesive and the like may be omitted or at least reduced. Thus, EHS and weather constraints will be minimal.

As explained, the receptor may be an, in particular threaded, bolt having a head either protruding from the strip or being level with the strip surface.

Generally, fastening the strip to the surface of the wind turbine blade assembly by an adhesive and/or mechanically, in particular by a screw or bolt connection, is desirable. That is, even if the electrically conductive strip is electrically coupled to the receptors by a spark gap, mechanically fastening may be implemented, thus reducing requirements regarding adhesives and 8haracteri EHS and weather constraints due to primary mechanical fastening of the strip. This also provides ease of implementation and service on the ground and from a platform.

In exemplary embodiments, the strip may be placed in a recess in the surface of the wind turbine blade assembly and/or may comprise a lateral sealing layer, in particular being tapered if placed on a flat portion of the surface. While the strip may be placed directly on the surface of the wind turbine blade assembly, it may be desirable to place it in channels/grooves of the surface. The edges of the strips may be sealed for dust/water ingress and/or for aerodynamic reasons. Such sealing may overlap slightly with the electrically conductive strip.

It is noted that, as the electrically conductive strip is limited to the assembly tip region, i.e. the second part of the length, and can be installed in a recessed fashion, for example in grooves/channels, it does not relevantly influence aerodynamics and/or noise characteristics.

As already explained, the second part of the length, that is, in particular, the at least one electrically conductive strip, only spans the assembly tip region. In particular, the second part may span at lest 1 to 3 meters of the distal part of the wind turbine blade. However, the second part comprises less than 50 percent of the length of the wind turbine blade assembly, in particular less than 25 percent of the length of the wind turbine blade assembly.

At least one strip may extend on both the windward and the leeward side of the wind turbine blade assembly. It is noted that the windward side may also be termed pressure side and the leeward side may also be termed suction side. In a typical scenario, two, in particular metallic, strips are employed on each of the windward and leeward sides of the wind turbine blade assembly, where they are electrically conductively coupled between two air termination devices, in particular a first air termination device and a second air termination device. In this manner, receiving areas/structures for lightning are provided at both sides.

However, in an alternative embodiment, it may also be provided that the at least one strip is provided only on the windward side or only on the leeward side of the wind turbine blade assembly, wherein second air termination devices are provided on both sides and their receptors are electrically conductively coupled. That is, electrically conductive strips may be used only on one side of the wind turbine blade assembly. In this case, only localised air terminations, that is, at least one second air termination device having a lightning receptor, is provided on the opposing side. In this scenario, the opposing receptors are electrically conductively coupled, for example, by using electrically conductive air termination bases. However, also dedicated other conductive structures and/or spark gaps may be used.

But also generally, the windward and leeward side second air termination devices may comprise a common air termination base, may be separate, but electrically conductively coupled (via a solid metallic connection or via a spark-gap) or may be separate and electrically conductively disconnected. The latter embodiment should not be used if the at least one strip is provided only on one side of the wind turbine blade assembly. As known from the state of the art, electrically conductive, in particular metallic, air termination bases may also be insulated where required.

In embodiments, at at least one of the windward side and the leeward side of the wind turbine blade assembly, multiple strips may be provided in a parallel and/or serial arrangement. In this manner, certain advantageous field distributions regarding lightning can be achieved, in particular regarding the formation of streamers and leaders.

In embodiments, at at least one side of the windward side and the leeward side, at least two second air termination devices are provided, wherein at least one of the at least one strip is electrically conductively coupled to receptors of more than one second air termination devices. That is, on at least one side of the wind turbine blade assembly, including the tip add-on where applicable, the strip may be connected between more than two air termination devices. For example, if a wind turbine blade add-on is used, the wind turbine blade itself may have a pair of second air termination devices, while the add-on may comprise two additional second air termination devices. Strips may now extend from the closest first air termination device over the second, intermediate air termination device in the blade tip area (or alternatively, already on the wind turbine blade add-on) to the outer second air termination device on the wind turbine blade add-on, electrically conductively coupling all their receptors. However, it is also possible, in particular in the case where a spark gap is used to electrically conductively couple the strip to the receptor, that two strips are provided, the first strip connecting the first air termination device and the intermediate second air termination device on the wind turbine blade or the add-on, the second strip electrically conductively coupling the intermediate second air termination device and the outer second air termination device of the wind turbine blade add-on. In embodiments, if one strip is used, the one strip may also extend ring-like around the intermediate second air termination device to provide the spark gap.

At least one of the at least one strip may also extend in a tipward direction beyond the second air termination device, to whose receptor the strip is electrically conductively coupled. In this manner, an unconstrained end of this strip may be free of any connection or be formed or connected to be electrically conductively coupled to, for example, a receptor of a second air termination device on an opposing side of the wind turbine blade assembly.

For example, in concrete embodiments, the strip may extend over the tip to the other side of the wind turbine blade assembly, in particular electrically conductively connecting to another strip and/or another receptor of a second air termination device, and/or the strip may be electrically conductively connected to at least one additional strip at least partly surrounding the wind turbine blade assembly. For example, a cone or a ring-shape structure may be formed for both the purpose of enhanced structural constrain and/or lightning interception.

In further exemplary embodiments, the surface of the at least one strip comprises at least one aerodynamic structure, in particular a vortex generator. Such aerodynamic structures may also be termed aerodynamically active structures or air guidance elements and may, comprise vortex generators. In other words, the electrically conductive strip, continuous or segmented, may actually take the form of a vortex generator, for example being a flat strip with protruding fins, to simultaneously perform both lightning protection and aerodynamic functions. The electrically conductive material of the strip may itself be configured to provide this aerodynamical function, however, it may also be possible that a strip is covered with separate elements, such as or forming a vortex generator. These separate elements may or may not be conductive.

Embodiments of the invention also concerns a method for manufacturing a wind turbine blade assembly according to embodiments of the invention, wherein the wind turbine blade assembly comprises a wind turbine blade add-on having at least one of the second air termination devices. The method comprises the steps of adding the wind turbine blade add-on to the wind turbine blade, and attaching the at least one strip on the surface, electrically conductively coupling the receptor of the at least one second air termination device of the wind turbine blade add-on to the receptor of at least one of the at least one first air termination device of the wind turbine blade.

All features and remarks regarding the wind turbine blade assembly also apply to the method according to embodiments of the invention, such that the same advantages may be achieved. In particular, no complicated interface structure for electrically conductively coupling an internal down conductor of the wind turbine blade add-on to the internal down conductor of the wind turbine blade is required, but simple and cost-efficient addition of the at least one strip is the only measure required to include the wind turbine blade add-on into the lightning protection system of the wind turbine blade.

BRIEF DESCRIPTION

Some of the embodiments will be described in detail, with reference to the following figures, wherein like designations denote like members, wherein.

DETAILED DESCRIPTION

Figure 1:
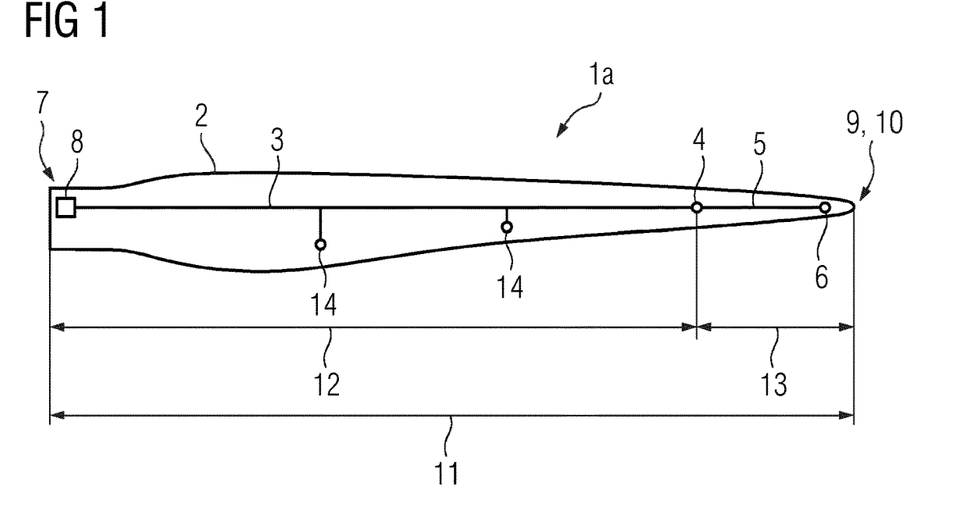
FIG. 1 shows a schematic view of a first embodiment of a wind turbine blade assembly according to the current invention.

FIG. 1 schematically illustrates a first embodiment of a wind turbine blade assembly 1a according to embodiments of the current invention. In this embodiment, the wind turbine blade assembly 1a comprises only a wind turbine blade 2 without any tip add-ons (wind turbine blade add-ons). The lightning protection system of the wind turbine blade assembly 1a comprises an internal down conductor 3 which is electrically conductively coupled to at least one first air termination device 4. The receptor of the first air termination device is, in turn, electrically conductively coupled to an external electrically conductive strip 5, in this case ending at a lightning receptor of a second air termination device 6, to which the strip 5 is electrically conductively coupled. At the blade root 7, a root terminal 8 is provided. In the region of the blade tip 9, which, in this case, also forms the assembly tip 10, the second air termination device 6 is not directly electrically conductively coupled to the internal down conductor 3, which ends at the first air termination device 4.

In other words, the total length 11 of the wind turbine blade assembly 1a from the blade root 7 to the assembly tip 10 is divided into a first part 12 along which the down conductor 3 extends to the first air termination device 4 and a second part 13 still having at least one second air termination device 6, but no internal down conductor 3. Instead, the external electrically conductive strip 5 is used to connect the pair of first air termination device 4 and second air termination device 6, as shown.

It is noted that further air termination devices 14 may be used in the first part 12 of the length 11, as known in the state of the art, but will not be further discussed here.

In this embodiment, the strip 5 directly electrically contacts the receptors of the air termination devices 4, 6, however, it may also be possible to use a spark gap to electrically conductively couple the strip 5 to the receptor of the first and second air termination devices 4, 6, as will be further discussed later on.

The electrically conductive strip 5 can be made of metal, metal-based composites, carbon or similar material, including the composites that may contain metallic particles of varied shapes and sizes. The electrically conductive band may further comprise hybrid structures, for example multi-layered structures involving metals, carbon, ETC, and/or composites thereof. Moreover, the strip 5 can be solid, hollow, grooved, slotted, internally porous, meshed, braided, or take other such formats. In particular, the strip 5 can also be a band. Although, in the shown embodiments, the strip 5 will mostly be shown straight, it can also be curved or bent.

Figure 2:
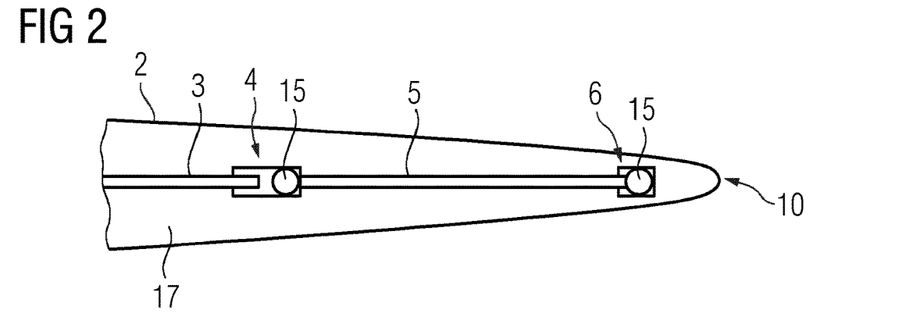
FIG. 2 shows a first schematic view of the assembly tip region of the first embodiment.
Figure 3:
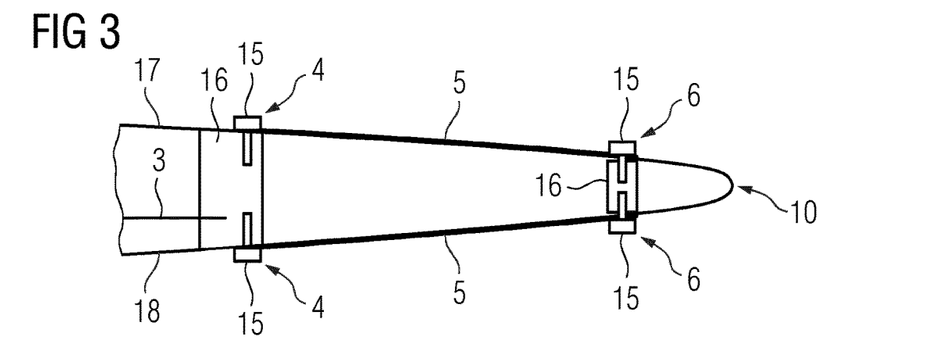
FIG. 3 shows a second schematic view of the assembly tip region of the first embodiment.

FIG. 2 and FIG. 3 show more detailed schematic views of the assembly tip region of the first embodiment. As can be seen, each air termination device 4, 6 comprises a receptor 15 and an air termination base 16. As can be seen from FIG. 3, first and second air termination devices 4, 6 are provided at the windward side 17 as well as on the leeward side 18. In the shown embodiment, the air termination devices 4, 6 both use common air termination bases 16. The strip 5 is provided on both sides 17, 18.

Figure 4:
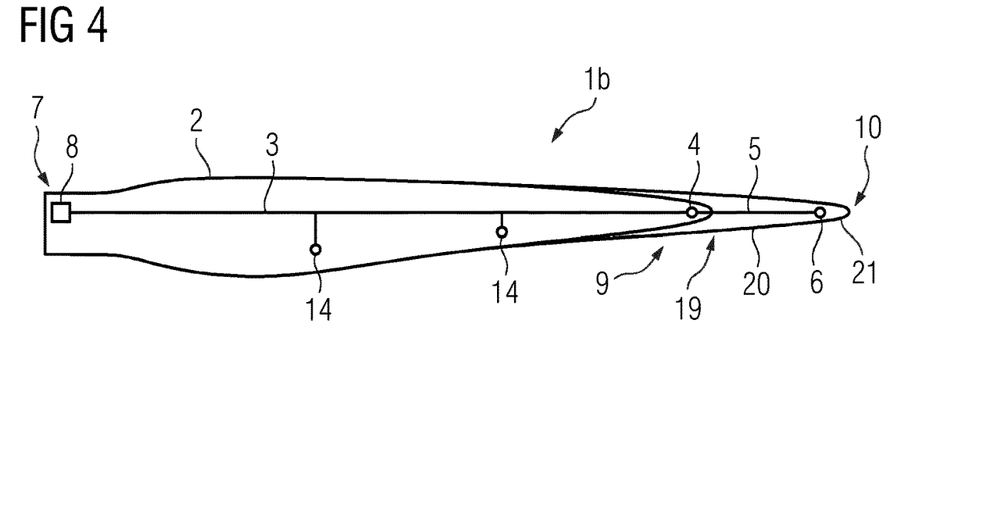
FIG. 4 shows a schematic view of a second embodiment of a wind turbine blade assembly according to the invention.
Figure 5:
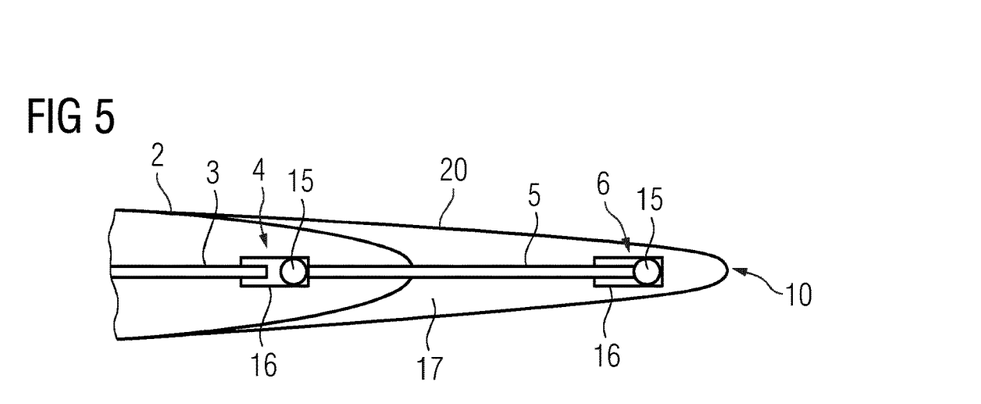
FIG. 5 shows a first schematic view of the assembly tip region of the second embodiment.
Figure 6:
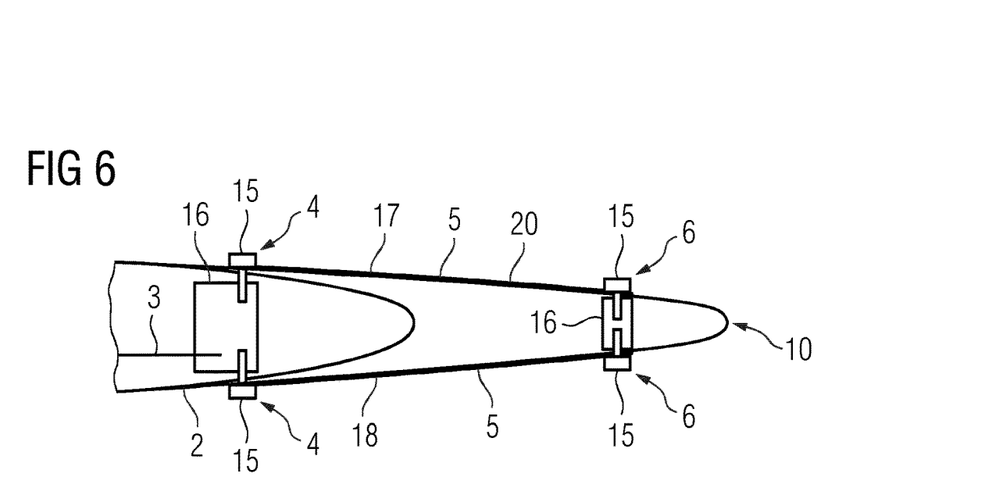
FIG. 6 shows a second schematic view of the assembly tip region of the second embodiment.

FIGS. 4 to 6 schematically show a second embodiment of a wind turbine blade assembly 1b according to embodiments of the current invention. In this case, the wind turbine blade assembly 1b comprises the blade 2 and additionally a wind turbine blade add-on 19 (tip add-on), in this case a tip extension 20. That is, the assembly tip 10 is no longer formed by a blade tip 9, but by the add-on tip 21. In this exemplary case, the first part 12 of the length 11 spans most of the wind turbine blade 2, while a second part 13 is mostly comprised by the wind turbine blade add-on 19. However, further embodiments are conceivable in which the wind turbine blade 2 is configured like in the first embodiment according to FIGS. 1 to 3, itself having a first air termination device 4 and a second air termination device 6.

As shown in the more detailed schematic views of FIG. 5 and FIG. 6, again, the wind turbine blade assembly 1b comprises a pair of first and second air termination devices 4, 6 on both the windward side 17 and the leeward side 18, the receptors 15 of each pair being electrically conductively coupled by strips 5.

Figure 7:
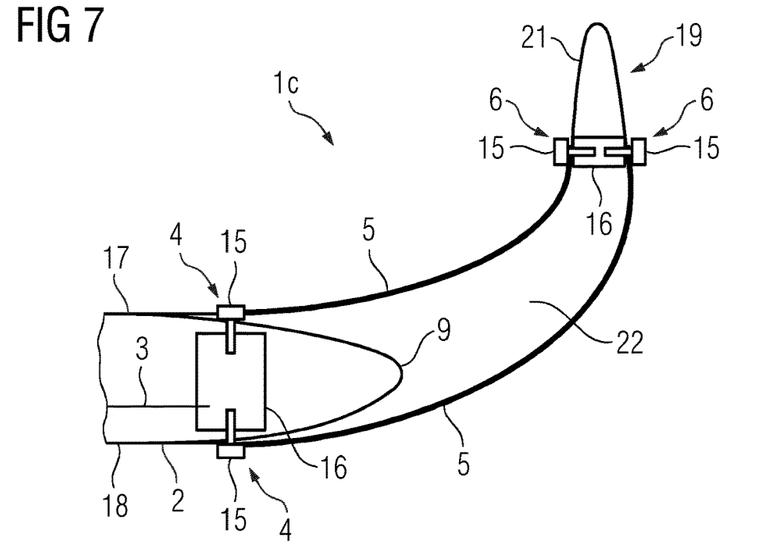
FIG. 7 shows a schematic view of the assembly tip region of a third embodiment of a wind turbine blade assembly according to the invention.

FIG. 7 shows a view of an assembly tip region of a third embodiment of a wind turbine blade assembly 1c, in a view corresponding to that of FIGS. 3 and 6. As can be seen, in this case, the blade tip 9 of the blade 2 is extended by a winglet 22 as wind turbine blade add-on 19. Apart from that, the configuration is as shown in FIG. 6.

Figure 8:
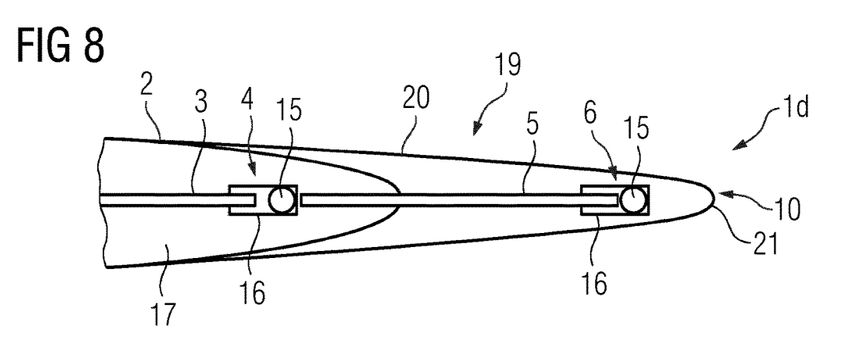
FIG. 8 shows a first schematic view of the assembly tip region of a fourth embodiment of a wind turbine blade assembly according to the invention.
Figure 9:
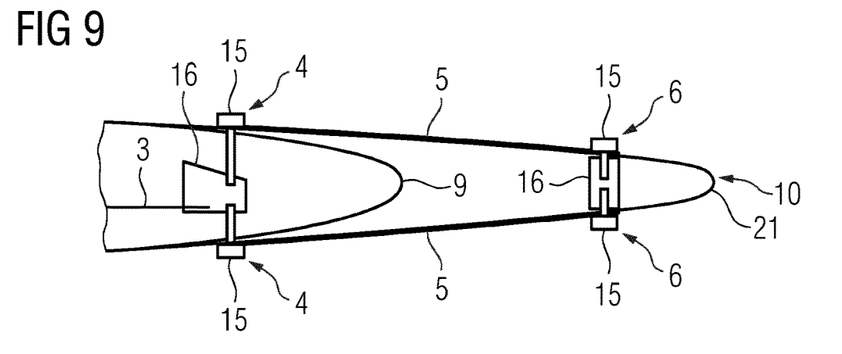
FIG. 9 shows a second schematic view of the assembly tip region of the fourth embodiment.

FIG. 8 and FIG. 9 show views of the assembly tip region of a fourth embodiment of a wind turbine blade assembly 1d according to embodiments of the invention, which is a modification of the second embodiment having a tip extension 20 as wind turbine blade extension 19. In contrast to the second embodiment, in this case, the strip 5 does not directly electrically conductively contact the lightning receptors 15 of the air termination devices 4, 6, but is electrically conductively coupled to them via a spark gap. In this manner, no work is needed regarding the air termination devices 4, 6 when extending the lightning protection system after mounting the wind turbine blade add-on 19. Instead, all that is required to include the wind turbine blade add-on 19 into the lightning protection system is to attach the strip 5 to the surface of the wind turbine blade assembly 1d between the first air termination device 4 and the second air termination device 6. The strip 5 is mechanically fastened, for example by threaded bolts, however, it may also be possible to alternatively and/or additionally affix the strip 5 using an adhesive.

It is noted that the spark gap configuration is, of course, also applicable with no add-ons 19 (first embodiment) or a winglet-type add-on 19 (third embodiment).

Due to the use of a spark gap in the fourth embodiment, the ends of the strip 5 may be subject to melting and/or erosion. Thus, the strip 5 is configured to withstand erosion and/or melting at its ends, wherein variants of such a strip 5, which may also be used cumulatively, are shown in FIGS. 10 to 12.

Figure 10:
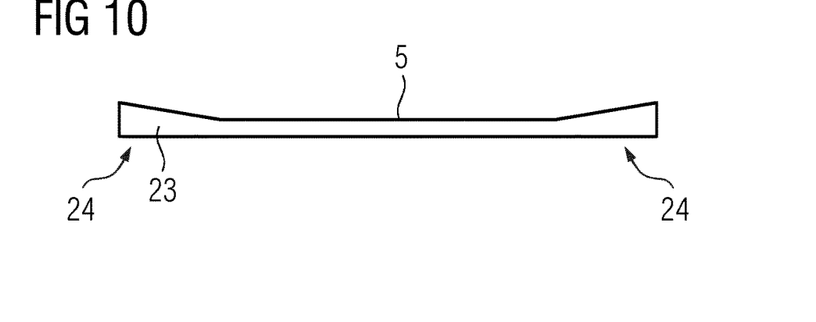
FIG. 10 shows a side view of a strip usable in the fourth embodiment.

FIG. 10 shows a variant of the strip 5 wherein the thickness of the conductive material 23 increases towards the ends 24 of the strip 5.

Figure 11:
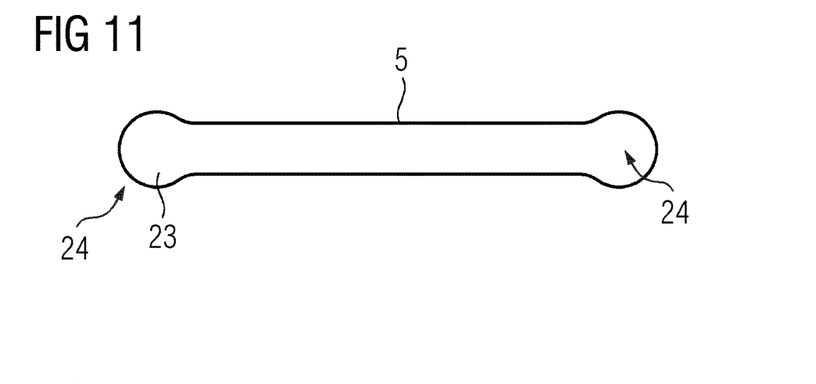
FIG. 11 shows a top view of a second variant of a strip usable in the fourth embodiment.
Figure 12:
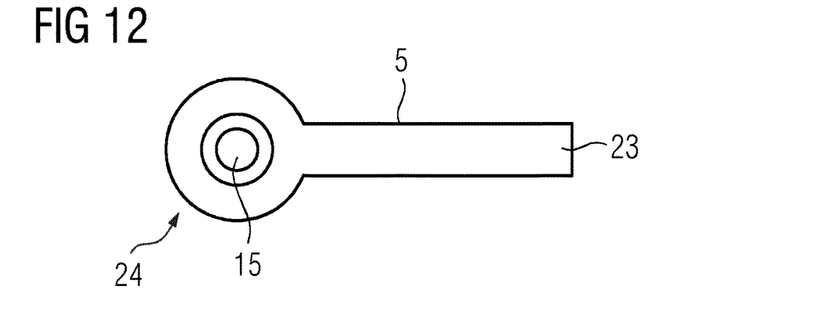
FIG. 12 shows a top view of a third variant of a strip usable in the fourth embodiment.

In the variant of FIG. 11, the area, in particular the width, of the electrically conductive material 23 of the strip 5 is increased at the ends 24.

In FIG. 4, a variant of the strip 5 is shown wherein the end 24 of the strip 5 surrounds the lightning receptor 15 in a spark gap distance like a ring.

Figure 13:
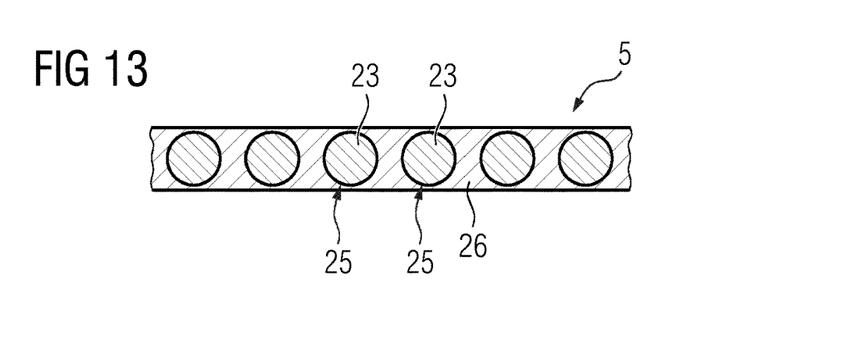
FIG. 13 shows a segmented strip.

While, in FIGS. 1 to 12, the strip 5 has been shown as having continuous conductive material 23, it is also possible to use a segmented strip, as shown in FIG. 13, wherein, in this variant, the strip 5 is a segmented diverter strip having dot-like electrically conductive material 23 segments 25, which may be disposed on a substrate 26. The distance between the segments 25 may differ along a single strip 5 or for different strips 5 to promote certain paths or distributions of lightning currents in case of a lightning strike.

Figure 14:
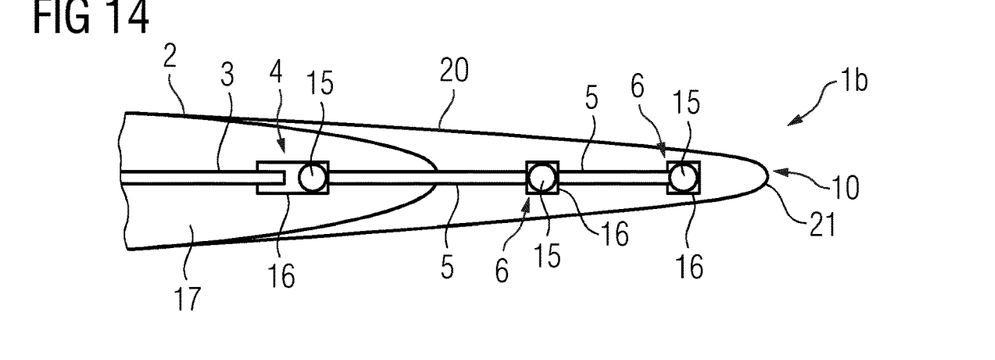
FIG. 14 shows a variant of the invention using two serially positioned strips.
Figure 15:
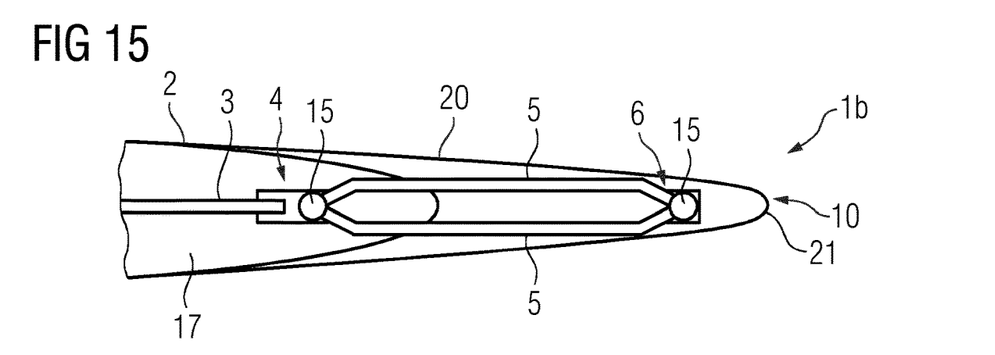
FIG. 15 shows a schematic view of two parallel strips.

FIGS. 14 and 15 show embodiments in which multiple strips 5 may be used on a side 17 of a wind turbine blade assembly, in this case a variant of the second embodiment 1b. In FIG. 14, a serial configuration of strips 5 is used, wherein the first strip 5 extends between a first air termination device 4 and an intermediate second air termination device 6, while the second strip 6 extends between the intermediate second air termination device 6 and an outer, further second air termination device 6.

In the variant of FIG. 15, two parallelly positioned strips 5 are used to each electrically conductively couple the lightning receptor 15 of the shown first air termination device 4 to the lightning receptor 15 of the shown second air termination device 6.

Figure 16:
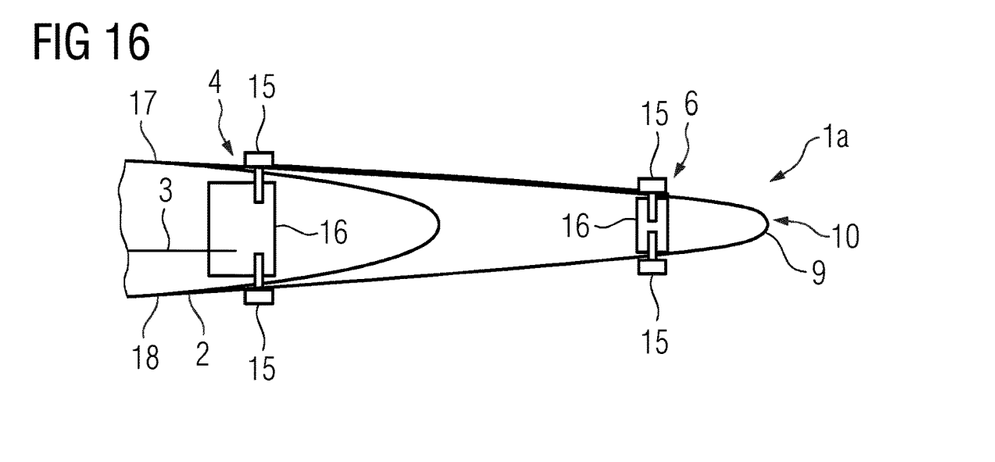
FIG. 16 shows a view of a variant of the first embodiment in the assembly tip region.
Figure 17:
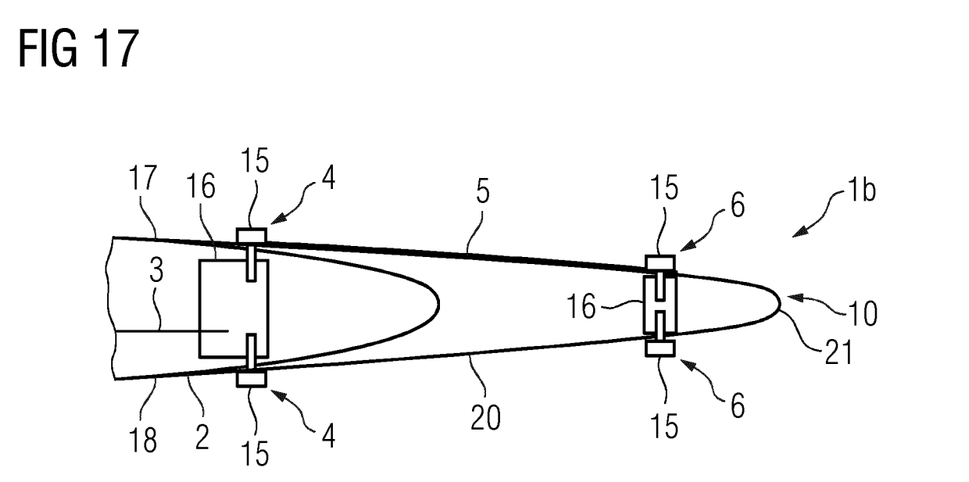
FIG. 17 shows a view of a variant of the second embodiment in the assembly tip region.
Figure 18:
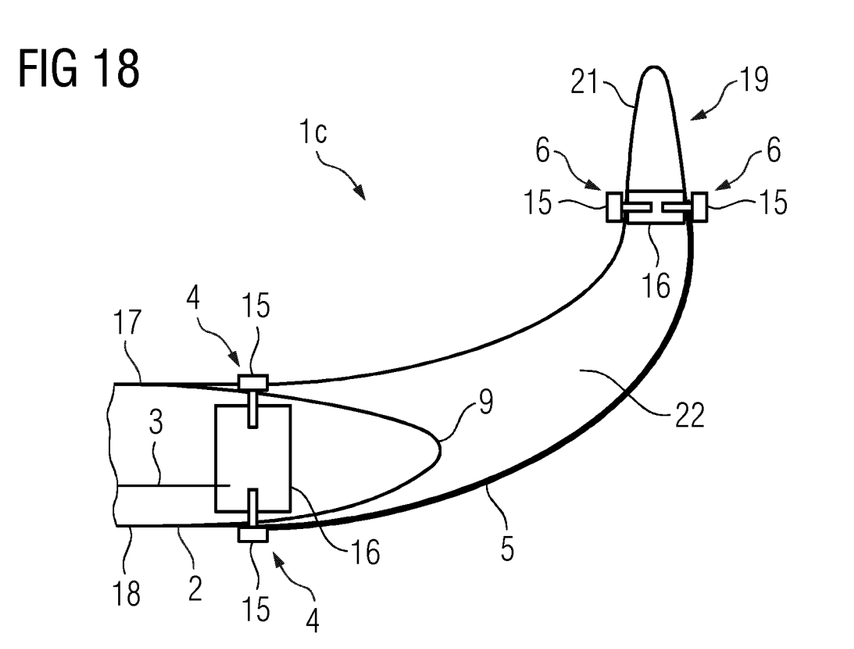
FIG. 18 shows a view of a variant of the third embodiment in the assembly tip region.

FIGS. 16 to 18 show variants of the first to third embodiments 1a, 1b and 1c. In each of these cases, a strip 5 is only used at one of the sides 17, 18, while the receptors 15 of the first and second air termination devices 4, 6 on the other side 18, 17 are not electrically conductively coupled by a strip 5. In this case, the second air termination devices 6 each comprise a common air termination base 16 which is electrically conductive, such that the receptor 15 can also receive a lightning current, which may be transported to the down conductor 3 via the opposite side.

Figure 19:
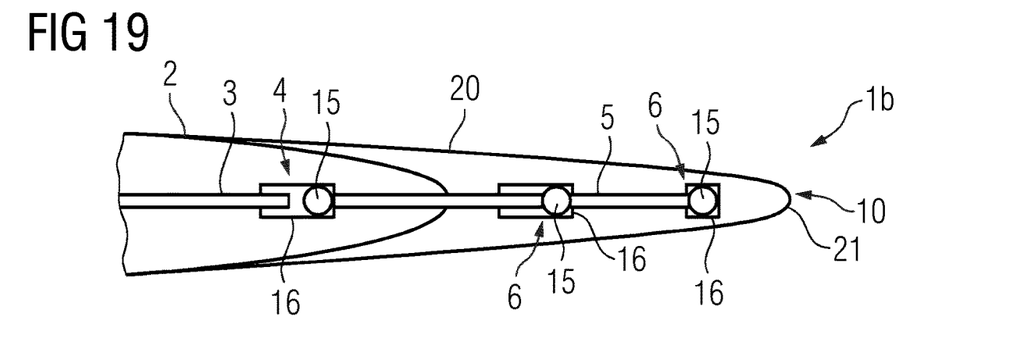
FIG. 19 shows a schematic view of a strip contacting two receptors of second termination devices.
Figure 20:
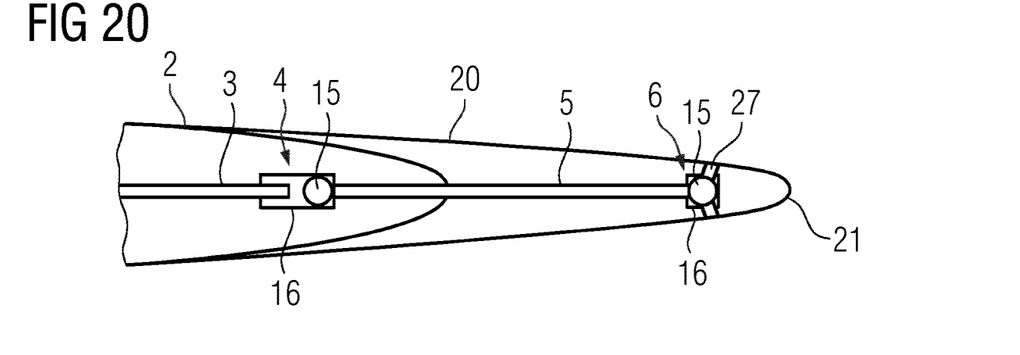
FIG. 20 shows a variant of the current invention using a ring-like strip.
Figure 21:
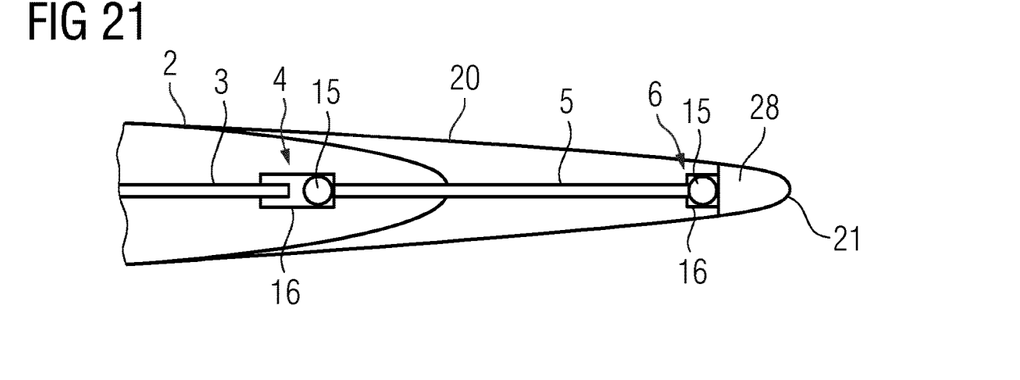
FIG. 21 shows a variant of the current invention using a tip-covering strip.

FIGS. 19 to 21 show further variants of the second embodiment of a wind turbine assembly 1b. In FIG. 19, multiple receptors 15 of multiple second air termination devices 6 are electrically conductively coupled by one and the same strip 5. In FIG. 20, a possible extension of the strip 5 as a ring 27 around the add-on tip 21 is shown. In FIG. 21, an arrow-head type extension 28 is used.

Figure 22:
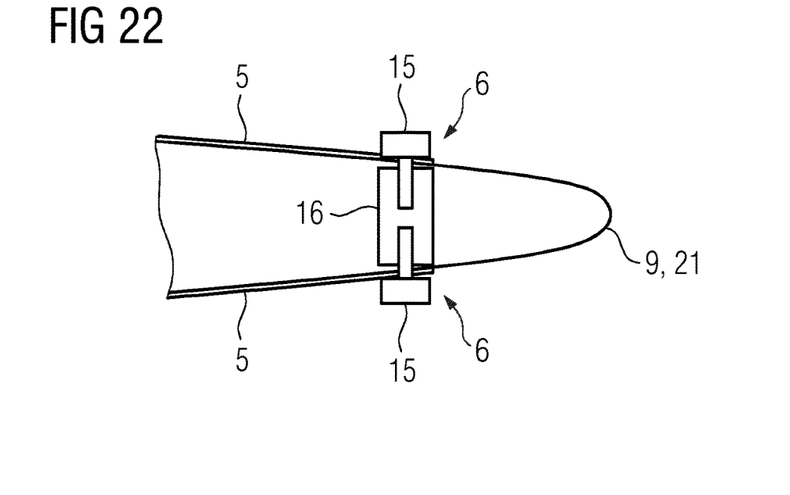
FIG. 22 shows a first configuration of opposing second air termination devices.
Figure 23:
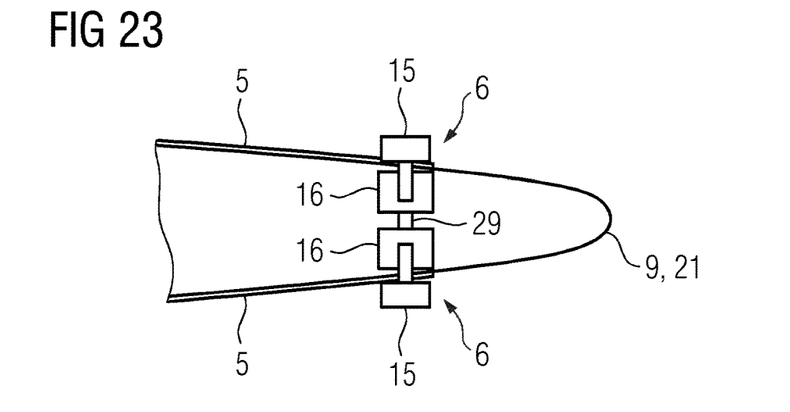
FIG. 23 shows a second configuration of opposing second air termination devices.
Figure 24:
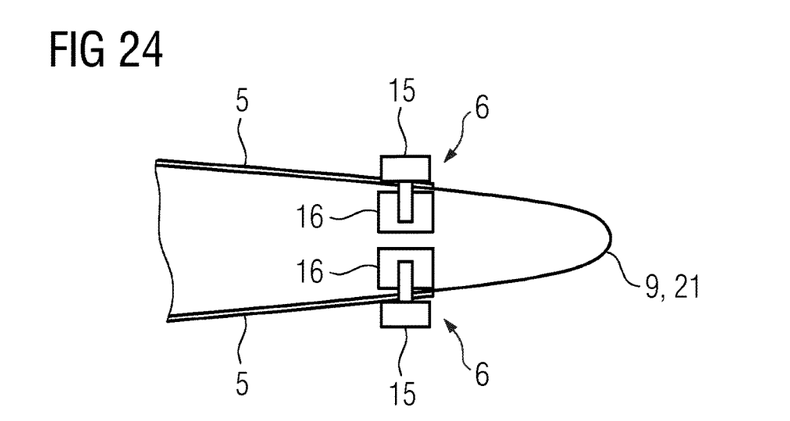
FIG. 24 shows a third configuration of opposing second air termination devices.

In FIGS. 22 to 24, multiple configurations of opposing second air termination devices 6 are shown. In FIG. 22, each of the second air termination devices 6 share a common air termination base 16, which may be electrically conductive to create an electrically conductive connection between receptors 15. In the case of FIG. 23, an electrically conductive connector 29 is used to electrically and mechanically connect air termination bases 16. FIG. 24 shows the case of separate and disconnected air termination bases 16.

Figure 25:
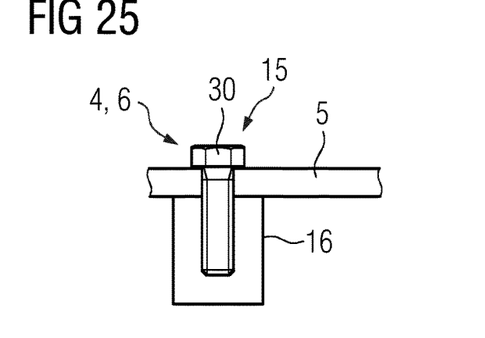
FIG. 25 shows a threaded receptor with bolt head for mechanically fixing strip and air termination device.
Figure 26:
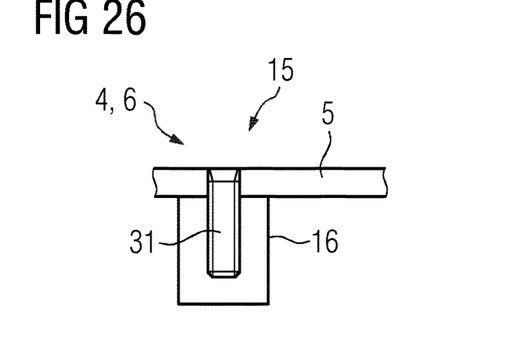
FIG. 26 shows a threaded receptor with shear off bolt for mechanically fixing strip and air termination device.
Figure 27:
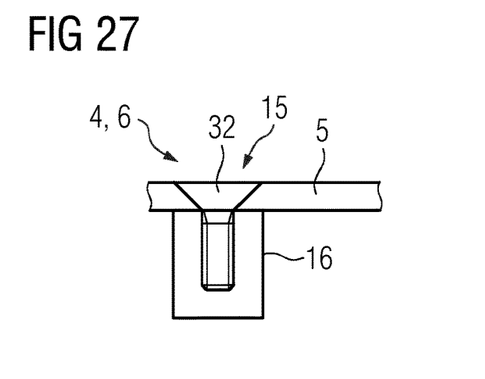
FIG. 27 shows a threaded receptor with a counter-sunk bolt for mechanically fixing strip and air termination device.
Figure 28:
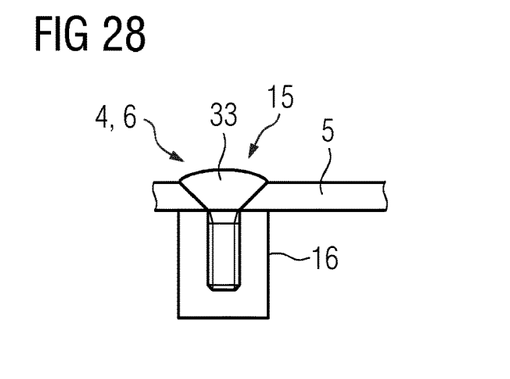
FIG. 28 shows a a threaded receptor with a rounded bolt-head used instead of the rectangular cross section of FIG. 25.

FIGS. 25 to 28 show multiple variants of threaded receptors 15 for mechanically fixing strip 5 at and air termination device 4, 6. In the case of FIG. 25, the threaded receptor 15 comprises usual bolt head 30, in the case of FIG. 26, a shear-off bolt 31 is used, in the case of FIG. 27, a countersunk bolt 32 is employed and in the case of FIG. 28, a rounded bolt-head 33 is used instead of the rectangular cross section of FIG. 25.

Figure 29:
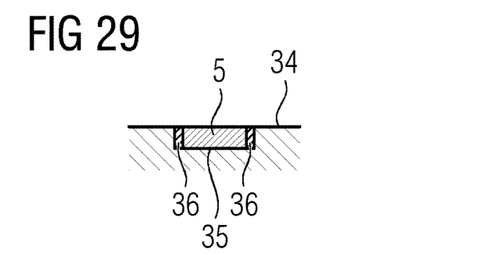
FIG. 29 a schematic view showing a strip guided in a groove.
Figure 30:
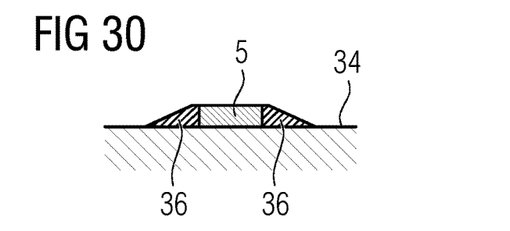
FIG. 30 a strip on a flat surface having tapered sealing layers.
Figure 31:
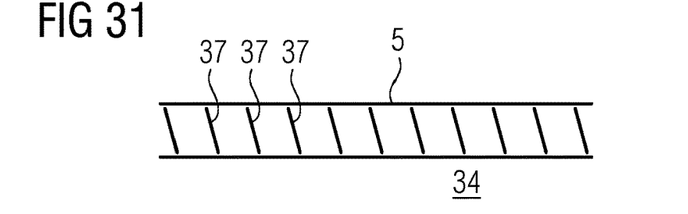
FIG. 31 aerodynamically active structures on a strip.

Finally, FIGS. 29 to 31 show variants for a fixing strip 5 on the surface 34 of the wind turbine blade assembly. In the case of FIG. 29, a recess 35, in this case a groove, is provided in the surface 34 for receiving the strip 5. Laterally, the strip 5 comprises a sealing layer 36.

In the case of FIG. 30, the strip 5 is deployed on the flat surface 34, wherein the sealing layers 36 are tapered to provide improved aerodynamic properties, in particular reduce the influence of the strip 5 regarding the aerodynamics of the wind turbine blade assembly.

It is noted that, as additional elements or integrally formed in the conducting material 23, the strip 5 may also comprise aerodynamic structures, in particular vortex generators. For example, as shown in FIG. 31, protruding fins 37 on an otherwise flat strip 5 may be used.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade assembly, comprising:
a wind turbine blade having a blade root for connection to a hub of a wind turbine;
an assembly tip, which is either formed by a blade tip of the wind turbine blade or an add-on tip of a wind turbine blade add-on attached to the blade tip of the wind turbine blade, wherein the wind turbine blade assembly spans a length from the blade root to the assembly tip; and
a lightning protection system comprising an internal down conductor inside the wind turbine blade and multiple air termination devices having at least one receptor, which is electrically conductively coupled to the down conductor;
wherein the length of the wind turbine blade assembly is divided into a first part spanning from the blade root to at least one first air termination device, in which the internal down conductor extends, and a second part spanning from the first air termination device to the assembly tip, in which the internal down conductor is absent;
wherein the lightning protection system further comprises:
at least one second air termination device in the second part, and
at least one external, electrically conductive strip extending at least between the first air termination device and the second air termination device in the second part and being electrically conductively coupled to receptors of the first air termination device and the second air termination device.

2. The wind turbine blade assembly according to claim 1, wherein the strip is made of a continuous material or segmented.

3. The wind turbine blade assembly according to claim 1, wherein the strip is electrically conductively coupled to the receptors of the respective first and second air termination devices by a spark gap.

4. The wind turbine blade assembly according to claim 3, wherein the strip at least partly surrounds at least one of the receptors in a predefined distance.

5. The wind turbine blade assembly according to claim 3, wherein a width and/or a thickness of a conductive material of the strip is increased in a coupling area around the respective receptors with respect to a non-coupling area farther away from the receptors.

6. The wind turbine blade assembly according to claim 1, wherein the strip is mechanically fastened to the air termination devices by the receptor, being clamped between the receptor and an air termination base of the air termination device.

7. The wind turbine blade assembly according to claim 6, wherein the receptor is a threaded bolt having a head either protruding from the strip or being level with a strip surface.

8. The wind turbine blade assembly according to claim 1, wherein the strip is fastened to a surface of the wind turbine blade assembly by an adhesive and/or mechanically.

9. The wind turbine blade assembly according to claim 1, wherein the strip is placed in a recess in a surface of the wind turbine blade assembly and/or comprises a lateral sealing layer, being tapered if placed on a flat portion of the surface.

10. The wind turbine blade assembly according to claim 1, wherein at least one strip extends on both a windward and a leeward side of the wind turbine blade assembly.

11. The wind turbine blade assembly according to claim 1, wherein the at least one strip is provided only on a windward side or only a leeward side of the wind turbine blade assembly, wherein second air termination devices are provided on both sides and the receptors are electrically conductively coupled.

12. The wind turbine blade assembly according to claim 1, wherein at least one of the at least one strip extends in a tipward direction beyond the second air termination device, to whose receptor the strip is electrically conductively coupled.

13. The wind turbine blade assembly according to claim 12, wherein the strip extends over the assembly tip to the other side of the wind turbine blade assembly, electrically conductively connecting to another strip and/or another receptor of a second air termination device, and/or is electrically conductively connected to at least one additional strip at least partly surrounding the wind turbine blade assembly.

14. The wind turbine blade assembly according to claim 1, wherein the surface of the at least one strip comprises at least one aerodynamic structure.

15. The method for manufacturing a wind turbine blade assembly according to claim 1, the wind turbine blade assembly comprising a wind turbine blade add-on having at least one of the second air termination devices, the method comprising:
adding the wind turbine blade add-on to the wind turbine blade; and
attaching the at least one strip on a surface of the wind turbine blade assembly, electrically conductively coupling the receptor of the at least one second air termination device to the receptor of at least one of the at least one first air termination device.

* * * * *